United States Patent
Chandrasekhar et al.

(10) Patent No.: US 9,864,614 B2
(45) Date of Patent: Jan. 9, 2018

(54) MAPPING VIRTUAL DEVICES TO COMPUTING NODES

(71) Applicant: Dell Products L.P., Round Rock, TX (US)

(72) Inventors: Babu Chandrasekhar, Round Rock, TX (US); Michael Brundridge, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 14/627,514

(22) Filed: Feb. 20, 2015

(65) Prior Publication Data

US 2015/0169338 A1 Jun. 18, 2015

Related U.S. Application Data

(63) Continuation of application No. 13/707,347, filed on Dec. 6, 2012, now Pat. No. 9,003,088.

(51) Int. Cl.
*G06F 13/40* (2006.01)
*G06F 9/455* (2006.01)
*G06F 9/50* (2006.01)
*H04L 12/931* (2013.01)

(52) U.S. Cl.
CPC .......... *G06F 9/455* (2013.01); *G06F 9/45558* (2013.01); *G06F 9/5077* (2013.01); *H04L 49/70* (2013.01); *G06F 13/4022* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2008/0016570 A1* | 1/2008 | Capalik | H04L 63/1408 726/23 |
| 2008/0046481 A1* | 2/2008 | Gould | G06F 17/30592 |
| 2009/0037682 A1* | 2/2009 | Armstrong | G06F 12/1475 711/164 |
| 2009/0044274 A1* | 2/2009 | Budko | G06F 21/53 726/24 |
| 2009/0276773 A1* | 11/2009 | Brown | G06F 9/45558 718/1 |
| 2010/0125653 A1* | 5/2010 | Cherian | G06F 13/4004 709/223 |
| 2010/0162241 A1 | 6/2010 | Koma | |
| 2010/0169661 A1 | 7/2010 | Summers et al. | |

(Continued)

*Primary Examiner* — Henry Tsai
*Assistant Examiner* — Christopher Bartels
(74) *Attorney, Agent, or Firm* — Jackson Walker L.L.P.

(57) ABSTRACT

A method for providing virtualization of information handling resources includes accessing a information handling system and a information handling resource, accessing a first virtual function configured to cause virtualized access to the information handling resource through the interface, accessing a second virtual function configured to cause virtualized access to the information handling resource through the interface, and selectively mapping the first virtual function and the second virtual function to information handling systems of the system. The selective mapping includes preventing the first virtual function and the second virtual function from both being mapped to the same information handling system.

9 Claims, 9 Drawing Sheets

(56) References Cited

U.S. PATENT DOCUMENTS

| | | | |
|---|---|---|---|
| 2011/0016235 A1 | 1/2011 | Brinkmann et al. | |
| 2011/0119423 A1* | 5/2011 | Kishore | G06F 13/102 710/302 |
| 2012/0222028 A1 | 8/2012 | Nakajima et al. | |
| 2014/0006676 A1* | 1/2014 | Chandrasekhar | G06F 13/4022 710/316 |
| 2014/0052309 A1* | 2/2014 | Chandrasekhar | G06F 1/26 700/297 |
| 2014/0164657 A1* | 6/2014 | Chandrasekhar | G06F 9/45558 710/104 |

* cited by examiner

MAPPING VIRTUAL DEVICES TO COMPUTING NODES

TECHNICAL FIELD

The present disclosure relates in general to information handling systems, and more particularly to mapping virtual devices to computing nodes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output ("I/O") resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with removal of information handling resources in a shared input/output infrastructure have been reduced or eliminated.

In one embodiment, a system includes an interface configured for accessing a information handling system and a information handling resource, a first virtual function configured to cause virtualized access to the information handling resource through the interface, a second virtual function configured to cause virtualized access to the information handling resource through the interface, and a chassis management controller comprising a processor. The processor is configured to selectively map the first virtual function and the second virtual function to information handling systems of the system. Configuring the processor to selectively map the first virtual function and the second virtual function includes preventing the first virtual function and the second virtual function from both being mapped to the same information handling system.

In another embodiment, a system includes an interface configured for accessing a information handling system and a information handling resource, a first virtual function configured to cause virtualized access to the information handling resource through the interface, a second virtual function configured to cause virtualized access to the information handling resource through the interface, and a chassis management controller including a processor. The information handling system includes a root port. The processor is configured to selectively map the first virtual function and the second virtual function to information handling systems of the system. Configuring the processor to selectively map the first virtual function and the second virtual function includes preventing the first virtual function and the second virtual function from both being mapped to the same root port of an information handling system.

In yet another embodiment, a method for providing virtualization of information handling resources includes accessing a information handling system and a information handling resource, accessing a first virtual function configured to cause virtualized access to the information handling resource through the interface, accessing a second virtual function configured to cause virtualized access to the information handling resource through the interface, and selectively mapping the first virtual function and the second virtual function to information handling systems of the system. The selective mapping includes preventing the first virtual function and the second virtual function from both being mapped to the same information handling system.

In still yet another embodiment, a method for providing virtualization of information handling resources includes accessing a information handling system and a information handling resource, accessing a first virtual function configured to cause virtualized access to the information handling resource through the interface, accessing a second virtual function configured to cause virtualized access to the information handling resource through the interface, and selectively mapping the first virtual function and the second virtual function to information handling systems of the system. The information handling system includes a root port. Selectively mapping the first virtual function and the second virtual function includes preventing the first virtual function and the second virtual function from both being mapped to the same root port of an information handling system.

In another embodiment, an article of manufacture includes a computer readable medium and computer-executable instructions carried on the computer readable medium. The instructions are readable by a processor. The instructions, when read and executed, cause the processor to access a information handling system and a information handling resource, access a first virtual function configured to cause virtualized access to the information handling resource through the interface, access a second virtual function configured to cause virtualized access to the information handling resource through the interface, and selectively map the first virtual function and the second virtual function to information handling systems of the system. The selective mapping includes preventing the first virtual function and the second virtual function from both being mapped to the same information handling system.

In yet another embodiment, an article of manufacture includes a computer readable medium and computer-executable instructions carried on the computer readable medium. The instructions are readable by a processor. The instructions, when read and executed, cause the processor to access a information handling system and a information handling resource, access a first virtual function configured to cause virtualized access to the information handling resource through the interface, access a second virtual function configured to cause virtualized access to the first information handling resource through the interface, and selectively map the first virtual function and the second virtual function to information handling systems of the system. Selectively mapping the first virtual function and the second virtual function includes preventing the first virtual function and the second virtual function from both being mapped to the same root port of an information handling system. The information handling system includes a root port.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
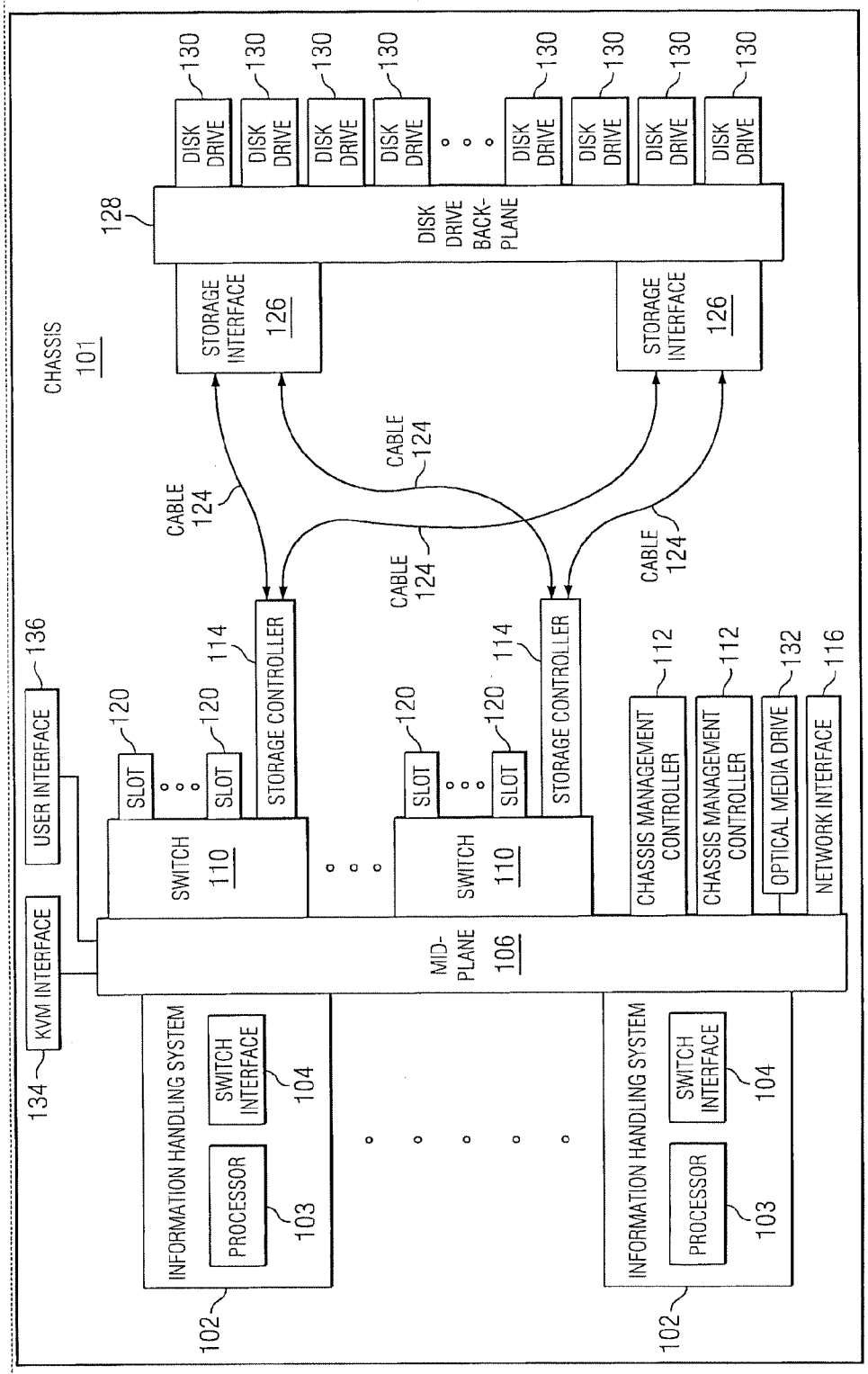
FIG. 1 illustrates a block diagram of an example system having a chassis with multiple information handling systems and with various peripheral and input/output capabilities common to a chassis as a whole, in accordance with certain embodiments of the present disclosure.

Preferred embodiments and their advantages are best understood by reference to FIGS. 1-9, wherein like numbers are used to indicate like and corresponding parts.

For the purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components or the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit."

Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems ("IHS") 102 and with various peripheral and input/output capabilities common to chassis 101 as a whole, in accordance with certain embodiments of the present disclosure. System 100 may be configured to provide mapping of virtualized devices to computing nodes such as information handling systems. Such a virtualization may utilize Single-Root("SR")-Input-Output Virtualization ("IOV") or Multi-Root("MR")-IOV techniques. Using SR-IOV or MR-IOV, a plurality of subscribers such as individual information handling systems may share the device for which mapping of virtual devices is provided.

As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to processor 103.

A processor 103 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise PCIe switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons. Switch interface 104 may comprise a mezzanine card.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component its component information handling resources. A chassis management controller 112 may be configured to issue commands and/or other signals to manage and/or control information handling system 102 and/or information handling resources of system 100. A chassis management controller 112 may be implemented with any suitable combination of digital circuitry, analog circuitry, or computer readable media. For example, chassis management controller 112 comprise a microprocessor, microcontroller, DSP, ASIC, field programmable gate array ("FPGA"), EEPROM, or any combination thereof. Such a processor or other circuitry implementation may be coupled to computer-readable media. Such computer-readable media may include instructions for execution by the circuitry, such as a processor, to carry out the configured operation of chassis management controller 112. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface ("IPMI") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output routing, and error detection and recovery. As shown in FIG. 1, a storage controller 114 may be coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically coupled such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low-profile to mid-plane 106, a switch 110, or other components, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with greater number (e.g., 25) disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk driver backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling information handling resources (e.g., Peripheral Component Interconnect Express ("PCIe") adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at time. Chassis management controller 112 may be configured to handle routing and switching through switches 110 to affect sharing or a resource to multiple information handling systems 102 or to affect dedicated assignment of a resource to a single information handling system 102.

Figure 2:
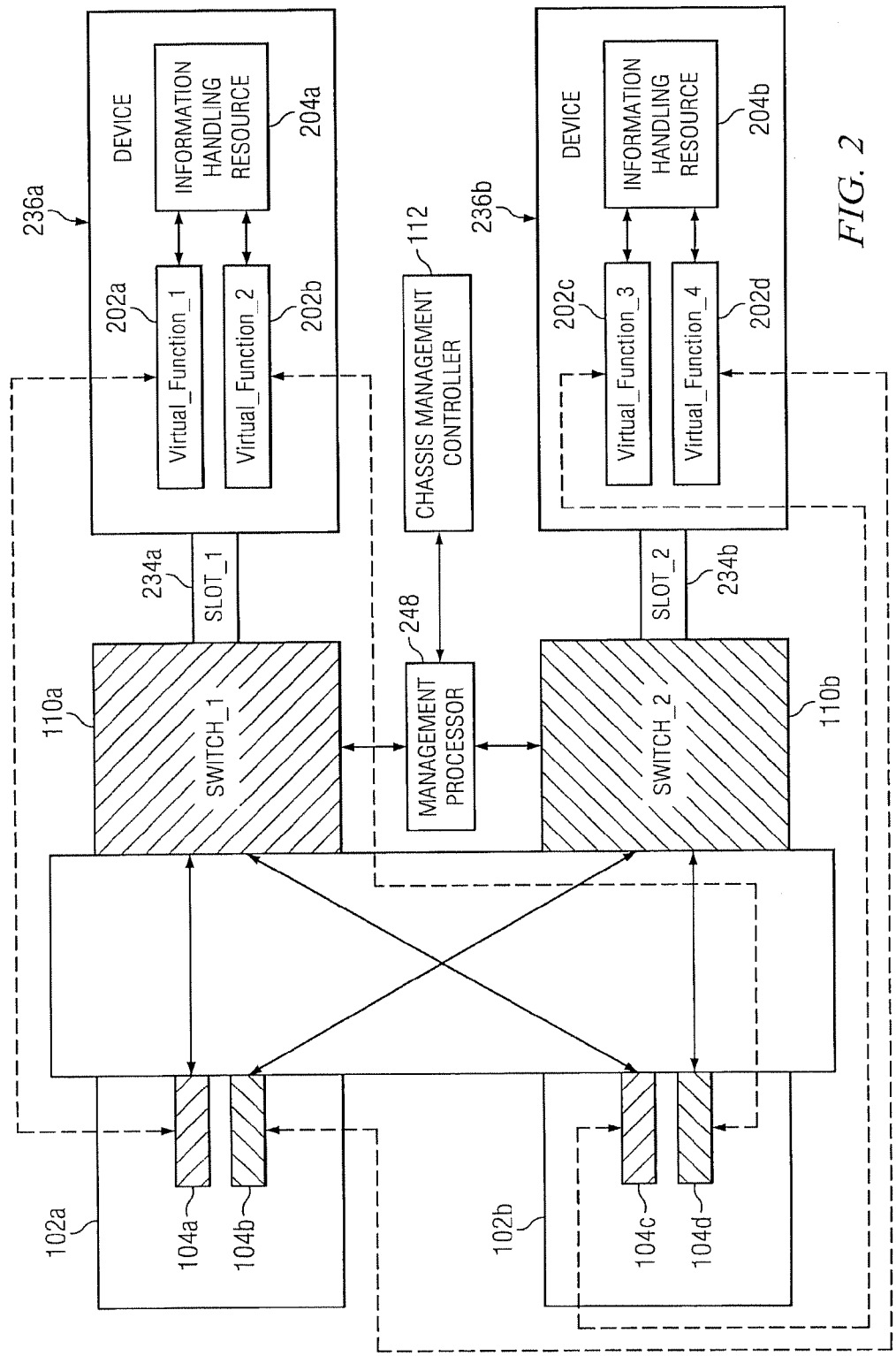
FIG. 2 illustrates a more detailed block diagram of an example system configured to provide mapping of virtual devices to computing nodes in a modular chassis for information handling systems in accordance with certain embodiments of the present disclosure.

FIG. 2 illustrates a more detailed block diagram of example system 100 configured to provide mapping of virtual devices to computing nodes in modular chassis 101 for information handling systems 102 in accordance with certain embodiments of the present disclosure. In one embodiment, system 100 may be configured to perform such mapping utilizing the SR-IOV or MR-IOV configuration of a device. Any suitable device may be used. In a further embodiment, such a device may include a storage device.

Chassis 101 may include a management processor 248 communicatively coupled to one or more of chassis management controller ("CMC") 112 and switches 110. Management processor 248 may include any system, device, or apparatus configured to facilitate management and/or control of switches 110. Management processor 248 may include any system, device, or apparatus configured to facilitate management and/or control of switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may run a Linux operating system and include application-programming-interfaces ("APIs") for supporting configuration of IOV in system 100 for sharing devices connected to slots of chassis 101 to multiple information handling systems 102 and for mapping devices that are to be dedicated to a single information handling system 102. The APIs of chassis management controller 248 may provide the interface to chassis management controller 112 for configuring IOV. Chassis management controller 248 may be configured to manage both switches 110.

Chassis management controller 112 may be directly communicatively coupled to information handling systems 102 through, for example, an Ethernet management fabric or through, for example, management processor 248. In one embodiment, the hardware or functionality of management processor 248 may be incorporated into chassis management controller 112. In such an embodiment, the functionality may be implemented as software in the form of a software service. Chassis 101 may include any suitable number of management processors 248. In one embodiment, chassis 101 may include a management processor implemented in similar fashion to management processor 248 for every switch in chassis 101.

Chassis 101 may include multiple information handling systems 102. Chassis 101 may include any suitable number of information handling systems 102. In one embodiment, information handling systems 102 may be referred to as "blades".

Each information handling system 102 may include switch interfaces 104, as described in association with FIG. 1. Switches 110 may contain PCIe cards instead of typical blade Ethernet, Fibre Channel or InfiniBand cards. Interfaces 104 of the information handling systems 102 may attach to switches 110 through the cards of switches 110. Switches 110 may connect information handling systems 102 to slots 234. Slots 234 may include one or more of the slots 120 of FIG. 1 in any suitable combination.

In one embodiment, each of information handling systems 102 may be communicatively coupled to each of switches 110 through one of switch interfaces 104 resident on the information handling system 102. For example, information handling system 102a may be communicatively coupled to switch_1 110a through switch interface 104a and to switch_2 110b through switch interface 104b. Information handling system 102b may be communicatively coupled to switch_1 110a through switch interface 104c and to switch_2 110b through switch interface 104d. Thus, each of switches 110 may provide its switching fabric to each of information handling systems 102 in order to route the given information handling system 102 to respective slots 234 associated with the respective switch 110.

Slots 234 may be configured to connect to associated devices 236, though fewer devices may be present than the associated capacity of chassis 101. Chassis 101 may include any suitable number of slots 234. In one embodiment, devices 236 may include PCIe-based cards or devices. Each such device 236 may include an information handling resource 204 to be selectively, for example, shared among multiple information handling systems 102 or dedicated to a single information handling system 102. Device 236 may comprise any suitable device such as a RAID controller, network card, or other information handling resource. In one further embodiment, devices 236 may include PCIe-based storage cards or devices.

In order to support IOV, the driver and firmware of device 236 may include support for SR-IOV or MR-IOV. To maintain routes between given information handling systems 102 and slots 234, switches 110 may include virtual hierarchies from slots 234 to information handling systems 102. Particular functions, such as virtual functions or shared functions, for single root IOV for a given device 236 may be mapped in switch 110, providing behavior similar to MR-IOV. In one embodiment, wherein device 236 contains multiple information handling resources such as a storage device and a USB interface, a function may be provided for each such information handling resource. Thus, from the perspective of information handling systems 102 the multiple such information handling resources may appear to be separate and unrelated. Furthermore, a virtual function may be provided for each such information handling system 102 that may share access to device 236. A given slot 234 or device 236 which has been virtualized may be accessed by such two or more virtual functions, which allow the sharing of the resource.

Physical functions, as opposed to the above-described virtual functions or shared functions, may be mapped or stored in chassis management controller 112 or management processor 248. A physical function representing an information handling resource may be provided to a single information handling system 102. In cases where a device 236 contains multiple information handling resources, individual physical functions may be provided for each such resource.

Multiple instances of a virtual function may be provided to multiple information handling systems 102. If, for example, multiple information handling systems 102 are sharing a device 236 that is a storage device, then access to device 236 may be divided into multiple storage devices using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

For example, device 236a may provide access to the information handling resource 204a contained therein by way of virtual_function_1 202a and virtual_function_2 202b. One such virtual function may be mapped to IHS 102a, while the other such virtual function may be mapped to IHS 102b. The mapping of device 236a with virtual_function_1 202a to IHS 102a may be performed through switch_1 110a, while the mapping of device 236a with virtual_function_2 202b to IHS 102b may be performed by routing the signal from device 236a through switch_1 110a to switch_2 110b and then to IHS 102b. Device 236b may provide access to the information handling resource 204b contained therein by way of virtual_function_1 202c and virtual_function_2 202d. One such virtual function may be mapped to IHS 102b, while the other such virtual function may be mapped to IHS 102a. The mapping of device 236b with virtual_function_1 202c to IHS 102b may be performed through switch_2 110b, while the mapping of device 236b with virtual_function_2 202d to IHS 102a may be performed by routing the signal from device 236b through switch_2 110b to switch_1 110a and then to IHS 102a.

A given device 236 may include as many virtual functions as necessary to perform its intended function. One or more virtual functions on a given device may be equivalent, such that an entity accessing the given device with a first virtual function may have equivalent and equal functionality as another entity accessing the given device with a second virtual function. For example, virtual_function_1 202a and virtual_function_2 202b on device 236a may provide equivalent functionality to each other. However, as described above, all virtual functions of a device need not be equivalent. One or more virtual functions between devices may be equivalent, such that an entity accessing one of the devices may have equivalent and equal functionality as another entity accessing another one of the devices. For example, virtual_function_1 202a and virtual_function_2 202b on device 236a may provide equivalent functionality to virtual_function_3 202c and virtual_function_4 202d on device 236b. Thus, the entities (such as an IHS) may require no adjustments for working with one of several information handling resources, which may be added or removed as necessary.

Chassis management controller 112 may be configured to map, route, switch, control, or otherwise direct other components of chassis 101 to map, route, switch, or control information between devices 236 and information handling systems 102. Such routing may be used to provide virtualization sharing and simultaneous communication between, for example, information handling system 102a and device 236a, information handling system 102a and device 236b, information handling system 102b and device 236a, or information handling system 102b and device 236b.

Chassis management controller 112 may be configured to map virtual functions of an information handling resource to information handling systems. Such a mapping may be performed at any suitable time, such as on-demand from an information handling systems, upon boot-up of an information handling system, or upon the loading of a driver for the information handling resource in an information handling system. In order to correctly map virtual functions associated with an information handling resource, chassis management controller 112 may be configured to determine what devices or information handling system resources are available on chassis 101. Chassis management controller 112 may be configured to interrogate an entity with an information handling resource such as device 236a or device 236b upon insertion, boot-up, or other activation of device 236a. Chassis management controller 112 may be configured to identify available virtual functions, such as virtual_function_1 202a and virtual_function_2 202b of device 236a or virtual_function_3 202c and virtual_function_4 202d of device 236b. Furthermore, chassis management controller 112 may be configured to identify the nature of information handling resource 204a within device 236a or information handling resource 204b within device 236b. For example, chassis management controller 112 may determine that information handling resource 204a includes disk storage and information handling resource 204b is configured to provide network connectivity. In another example, chassis management controller 112 may determine that information handling resource 204a and information handling resource 204b may both be configured to include disk storage and are portions of a redundant array of independent disks.

In addition, in order to correctly map virtual functions associated with an information handling resource chassis management controller 112 may be configured to determine what information handling systems are connected to chassis 101. Chassis management controller 112 may be configured to interrogate an information handling system such as information handling system 102a and information handling system 102b upon, for example, insertion, boot-up, or other activation of information handling system 102a and information handling system 102b. In accessing any such information handling system, chassis management controller 112 may be configured to determine the size (such as double-high or double-wide, full-height, half-height, or quarter-height), number of root ports, or other configuration of such an information handling system as well as the number of such information handling systems. Furthermore, chassis management controller 112 may be configured to determine the needs of such information handling systems for use of information handling resources. Chassis management controller 112 may be configured to map, route, switch, control, or otherwise direct other components of chassis 101 to map, route, switch, or control information between devices 236 and information handling systems 102 to service such needs.

In the example of FIG. 2, chassis management controller 112 may have virtualized access to device 236a to information handling system 102a by providing access for information handling system 102a to virtual_function_1 202a. Such access may be provided from the device through switch_1 110a and through to the associated switch interface 104a. Furthermore, chassis management controller 112 may have virtualized access to device 236a to information handling system 102b by providing access for information handling system 102a to virtual_function_2 202b. Such access may be provided from switch_1 110a, routed through switch_2 110b, and to the associated switch interface 104d. Chassis management controller 112 may have virtualized access to device 236b to information handling system 102a by providing access for information handling system 102a to virtual_function_3 202c. Such access may be provided through switch_1 110a and through the associated switch interface 104a. Furthermore, chassis management controller 112 may have virtualized access to device 236b to information handling system 102b by providing access for information handling system 102b to virtual_function_4 202d.

In various embodiments, chassis 101 may be deployed in situations requiring the temporal persistence of configuration regarding the operation of chassis 101. For example, chassis 101 may be deployed among many other similarly configured chasses as redundant part of a server farm. Thus, by default, chassis 101 may be configured to maintain its operation even as existing information handling systems in chassis 101 are replaced and with other information handling systems. Such a persistence in configuration may be carried out, for example, by chassis management controller 112. For example, in FIG. 2 wherein chassis management controller 112 may have established the virtualization of device 236a to information handling system 102a through virtual_function_1 202a and to information handling system 102b through virtual_function_3, given that information handling system 102a is replaced with a similarly configured information handling system, chassis management controller 112 may be configured to maintain the assignment of virtual_function_1 202a to the new information handling system by default.

However, various assignments that may be made by chassis management controller 112 of virtual functions to information handling systems may potentially violate standards, cause device conflicts, or increase the risk of disk corruption. Such assignments may be made upon, for example: initiation, boot-up, or other activation of information handling systems; changes in processing needs, resource availability, or prioritization of access to information handling system resources; or upon swapping, replacing, or other physical changing of the information handling systems. Thus, chassis management controller 112 may be configured to selectively make assignments of virtual functions to information handling systems in chassis 101.

Chassis management controller 112 may be configured to make such selective assignments based on any suitable criteria. In one embodiment, chassis management controller 112 may be configured to selectively assign virtual functions to information handling systems in chassis 101 such that no two virtual functions for the same device are assigned to the same root port of a given information handling system. In another embodiment, chassis management controller 112 may be configured to selectively assign virtual functions to information handling systems in chassis 101 such that no two virtual functions for the same device are assigned to a given information handling system. In a further embodiment, chassis management controller 112 may be configured to make such a selective assignment for devices that include storage devices.

Chassis management controller 112 may be configured to make such selective assignments at any suitable time. In one embodiment, chassis management controller 112 may be configured to make such selective assignments upon initiation, boot-up, or other activation of information handling systems or of the information handling resources in chassis 101. In another embodiment, chassis management controller 112 may be configured to make such selective assignments upon changes in processing needs of information handling systems, resource availability, or prioritization of access to information handling system resources in chassis 101. In yet another embodiment, chassis management controller 112 may be configured to make such selective assignments upon swapping, replacing, or other physical or virtual changing of the information handling systems of chassis 101.

In operation, chassis management controller 112 may be operating on chassis 101. One or more information handling systems such as information handling system 102a and information handling system 102b may be inserted into chassis 101, booted-up on chassis 101, or otherwise activated on chassis 101.

Chassis management controller 112 may interrogate or query information handling system 102a and information handling system 102b to determine the size, footprint, processing needs, and other use or configuration information. One or more information handling system resources included in devices such as device 236a and device 236b may be inserted into chassis 101, booted-up on chassis 101, or otherwise activated on chassis 101. Chassis management controller 112 may query such elements directly or through use of other portions of chassis 101.

Chassis management controller 112 may interrogate device 236a and device 236b to determine, for example, the existence and nature of virtual_function_1 202a, virtual_function_2 202b, and information handling resource 204a of device 236a, and virtual_function_3 202c, virtual_function_4 202d, and information handling resource 204b of device 236b. Chassis management controller 112 may determine which of the virtual functions of a given device, such as device 236a or device 236b, virtualize access to the same resources. Furthermore, chassis management controller 112 may determine which of the virtual functions in any device of chassis 101 are interchangeable between devices. Chassis management controller 112 may query such elements directly or through use of other portions of chassis 101.

Chassis management controller 112 may cause the mapping presentation of virtual functions such as virtual_function_1 202a, virtual_function_2 202b, virtual_function_3 202c, and virtual_function_4 202d to information handling systems of chassis 101 such as information handling system 102a and information handling system 102b. In order to facilitate virtualization, chassis management controller 112 may map and present virtual_function_1 202a and virtual_function_3 202c to information handling system 102a and may map and present virtual_function_2 202b virtual_function_4 202d to information handling system 102b. Such a mapping and presentation may occur upon boot-up, initialization, or insertion of each of information handling system 102a or information handling system 102b, or upon the loading of a driver by information handling system 102a or information handling system 102b for device 236a or device 236b.

Chassis management controller 112 may selectively assign, map and present virtual functions to information handling systems in a manner such that no two virtual functions for the same device are assigned to the same root port of a given information handling system. For example, if chassis management controller 112 has assigned virtual_function_1 202a to a root port of information handling system 102a, a subsequent assignment of virtual_function_2 202b will not be made to the same root port of information handling system 102a. Instead, for example, assignment of virtual_function_2 202b may be made to information handling system 102b or to a second root port of information handling system 102a. A need for information handling system 102a to access to additional devices may be provided instead, for example, by assignment of virtual_function_4 202d of device 236b to information handling system 102a.

Although the example illustrated in FIG. 2 shows information handling system 102a and information handling system 102b with a single set of switch interfaces, a given one of information handling system 102a or information handling system 102b may include multiple root ports and multiple sets of switch interfaces. Chassis management controller 112 may selectively assign, map and present virtual functions to information handling systems in a manner such that no two virtual functions for the same device are assigned to the same given information handling system. Such a selection may be made if, for example, the virtual functions relate to a storage device. For example, if chassis management controller 112 has assigned virtual_function_1 202a, wherein device 236a includes a disk storage device, information handling system 102a, a subsequent assignment of virtual_function_2 202b will not be made to information handling system 102a. Instead, for example, assignment of virtual_function_2 202b may be made to information handling system 102b. A need for information handling system 102a to access to additional storage devices may be provided instead, for example, by assignment of virtual_function_4 202d of device 236b to information handling system 102a.

In one embodiment, chassis management controller 112 may be configured to intercept attempts to map virtual functions and information handling systems in chassis 101. Such attempts may be initiated by other elements of chassis 101. In such an embodiment, chassis management controller 112 may review the request in view of policies, such as disallowing the mapping of multiple virtual functions of the same device to the same root port of an information handling system; or allowing or disallowing the mapping of multiple virtual functions of the same device to the same information handling system. Such allowance or disallowance of mapping of multiple virtual functions of the same device to the same information handling system may be based on the nature of the device to be virtualized. If the requested attempt violates the policies, chassis management controller 112 may be configured to remap the virtual functions to the information handling systems. In another embodiment, chassis management controller 112 may itself initiate attempts to map virtual functions and information handling systems in chassis 101. In such an embodiment, chassis management controller 112 may be configured map the virtual functions to the information handling systems in view of policies such as those described above.

Figure 3:
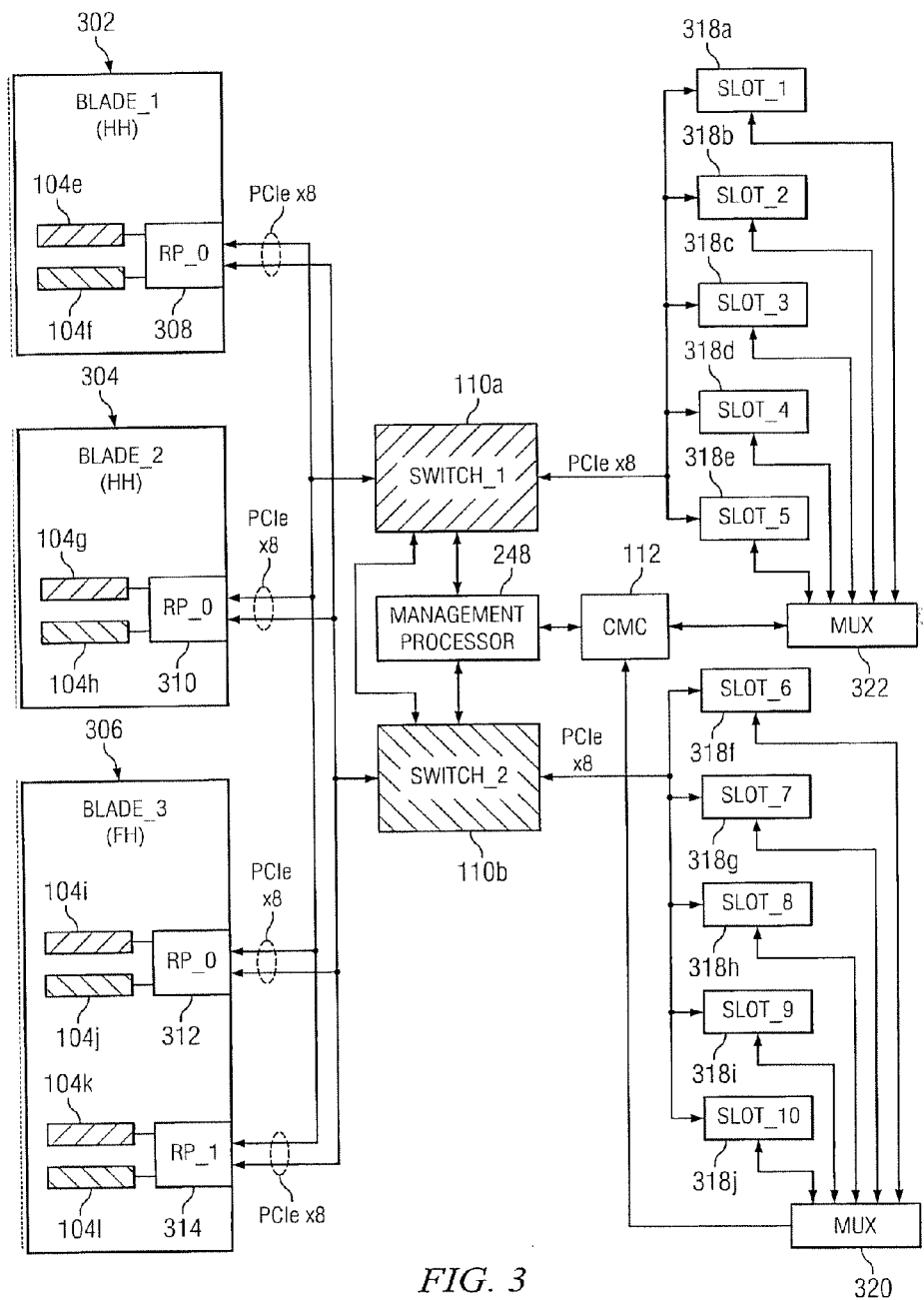
FIG. 3 illustrates a more detailed diagram of an embodiment of a system configured to provide mapping of virtual devices to computing nodes in a modular chassis for various types of information handling systems and slot configurations.

FIG. 3 illustrates a more detailed diagram of an embodiment of system 100 configured to provide mapping of virtual devices to computing nodes in modular chassis 101 for various types of information handling systems and slot configurations. For example, chassis 101 may include blade_1 302, blade_2 304, and blade_3 306, each of which may be communicatively coupled to switch_1 110a and switch_2 110b. Blade_1 302, blade_2 304, and blade_3 306 may each implement an information handling system 102 of FIGS. 1-2. Blade_1 302 may include a half-height information handling system, including switch interfaces 104e, 104f and a single root port RP_0 308. Blade_1 302 may be communicatively coupled to switch_1 110a through switch interface 104e and to switch_2 110b through switch interface 104f. Access to switch interface 104e and switch interface 104f may be controlled through RP_0 308. Blade_2 304 may include a half-height information handling system, including switch interfaces 104g, 104h and a single root port RP_0 310. Blade_2 304 may be communicatively coupled to switch_1 110a through switch interface 104g and to switch_2 110b through switch interface 104h. Access to switch interface 104g and switch interface 104h may be controlled through RP_0 310. Blade_3 306 may include a full-height information handling system, including switch interfaces 104i, 104j, 104k, 104l and two root ports RP_0 312 and RP_0 314. Blade_3 306 may be communicatively coupled to switch_1 110a through switch interface 104i and switch interface 104k and to switch_2 110b through switch interface 104j and switch interface 104l. Access to switch interface 104i and switch interface 104j may be controlled through RP_0 312, while Access to switch interface 104k and switch interface 104l may be controlled through RP_1 314. In one embodiment, each of RP_0 308, RP_0 310, RP_0 312, and RP_1 314 may be communicatively coupled to their respective switches using a PCIe communications channel.

Furthermore, for example, chassis 101 may include slot_1 318a, slot_2 318b, slot_3 318c, slot_4 318d, slot_5 318e, slot_6 318f, slot_7 318g, slot_8 318h, slot_9 318i, and slot_10 318j, which may each implement one of slots 120 of FIG. 1. Each of slot_1 318a, slot_2 318b, slot_3 318c, slot_4 318d, and slot_5 318e may be communicatively coupled to switch_1 110a through a given slot's input-output ports and, furthermore, multiplexed through multiplexer ("MUX") 322 through a communication port to chassis management controller 112. Each of slot_6 318f, slot_7 318g, slot_8 318h, slot_9 318i, and slot_10 318j may be communicatively coupled to switch_1 110a through a given slot's input-output ports and, furthermore, multiplexed through MUX 320 through a communication port to chassis management controller 112. In one embodiment, each of slot_1 318a, slot_2 318b, slot_3 318c, slot_4 318d, slot_5 318e, slot_6 318f, slot_7 318g, slot_8 318h, slot_9 318i, and slot_10 318j may be communicatively coupled to their respective switches using a PCIe communications channel.

Chassis management controller 112 may be communicatively coupled to MUX 322 and to MUX 320. Furthermore, chassis management controller 112 may be configured to interrogate each of slot_1 318a, slot_2 318b, slot_3 318c, slot_4 318d, slot_5 318e, slot_6 318f, slot_7 318g, slot_8 318h, slot_9 318i, and slot_10 318j and their respective devices through accessing MUX 322 and MUX 320.

Switch_1 110a may be configured to switch any communications from blade_1 302, blade_2 304, or blade_3 306 sent through their respective switch interfaces 104e, 104g, 104i, and 104k through RP_0 308, RP_0 310, or RP_0 312 and received at switch_1 110a to devices of slot_1 318a, slot_2 318b, slot_3 318c, slot_4 318d, or slot_5 318e. Furthermore, switch_1 110a may be configured to switch any such received communications to devices of slot_6 318f, slot_7 318g, slot_8 318h, slot_9 318i, or slot_10 318j by switching such communications through switch_2 110b, which may further switch the communications. The switching of switch_1 110a may itself be controlled by assignment of virtual functions by chassis management controller 112.

Switch_2 110b may be configured to switch any communications from blade_1 302, blade_2 304, and blade_3 306 sent through their respective switch interfaces 104f, 104h, 104j, and 104l through RP_0 308, RP_0 310, or RP_0 312 and received at switch_2 110b to devices of slot_6 318f, slot_7 318g, slot_8 318h, slot_9 318i, and slot_10 318j. Furthermore, switch_2 110b may be configured to switch any such received communications to devices of slot_1 318a, slot_2 318b, slot_3 318c, slot_4 318d, or slot_5 318e by switching such communications through switch_1 110a, which may further switch the communications. The switching of switch_1 110b may itself be controlled by assignment of virtual functions by chassis management controller 112.

During interrogation of blade_1 302, blade_2 304, and blade_3 306, chassis management controller 112 may be configured to determine which switch interfaces of a given information handling system are accessible through which root ports. Chassis management controller 112 may be configured to use such a determination when mapping a given virtual function of a device to a given root port on a given information handling system. Furthermore, chassis management controller 112 may be configured to determine that blade_1 302 and blade_2 304 are half-height and that blade_3 306 is full-height.

The size of information handling systems in chassis 101 may dictate the placement of each when chassis 101 is in use. For example, the space used in chassis 101 by blade_1 302 and blade_2 304 may be equivalent by blade_3 306. In a similar fashion, other information handling systems with quarter-height may use half of the space in chassis 101 used by a half-height information handling system such as blade_1 302. Furthermore, another information handling system with double-height size may use twice the space in chassis 101 used by a full-height information handling system such as blade_3 306. A single full-height information handling system such as blade_3 306 may be replaced by two half-height information handling systems such as blade_1 302 and blade_2 304, and vice-versa.

Each of root ports RP_0 308, RP_0 310, and RP_0 312 may be implemented in any suitable manner. In one embodiment, each of root ports RP_0 308, RP_0 310, and RP_0 312 may include a port on the root complex on their respective information handling systems. Furthermore, each of root ports RP_0 308, RP_0 310, and RP_0 312 may include a host bridge for their respective information handling systems.

Figure 4A:
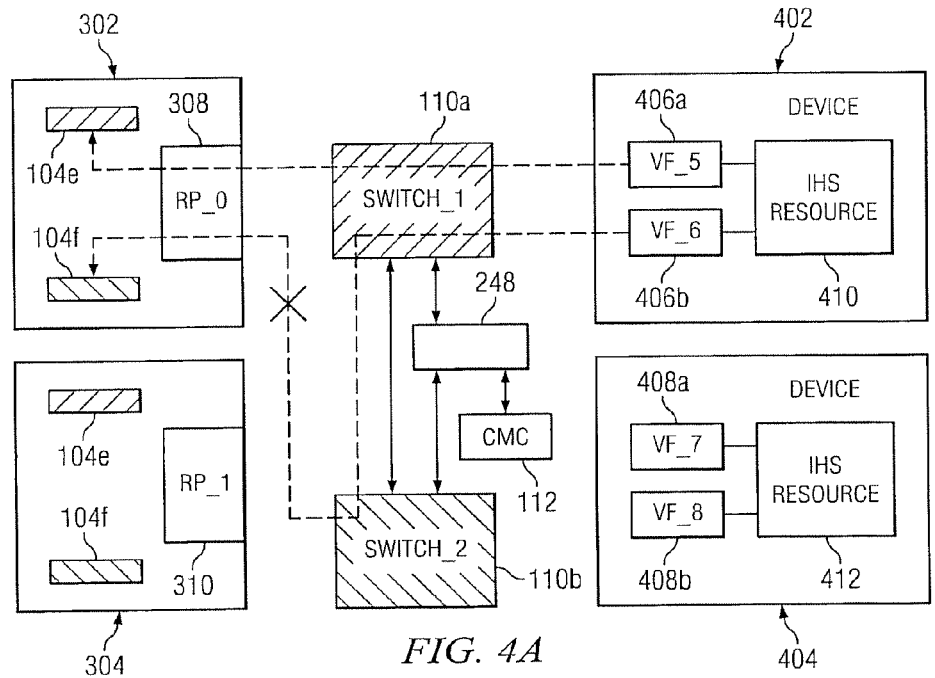
FIGS. 4A and 4B illustrate the operation of an embodiment of a system configured to provide mapping of virtual devices to computing nodes in a modular chassis wherein mapping of multiple virtual functions from the same device to the same root port of an information handling system is prevented.
Figure 4B:
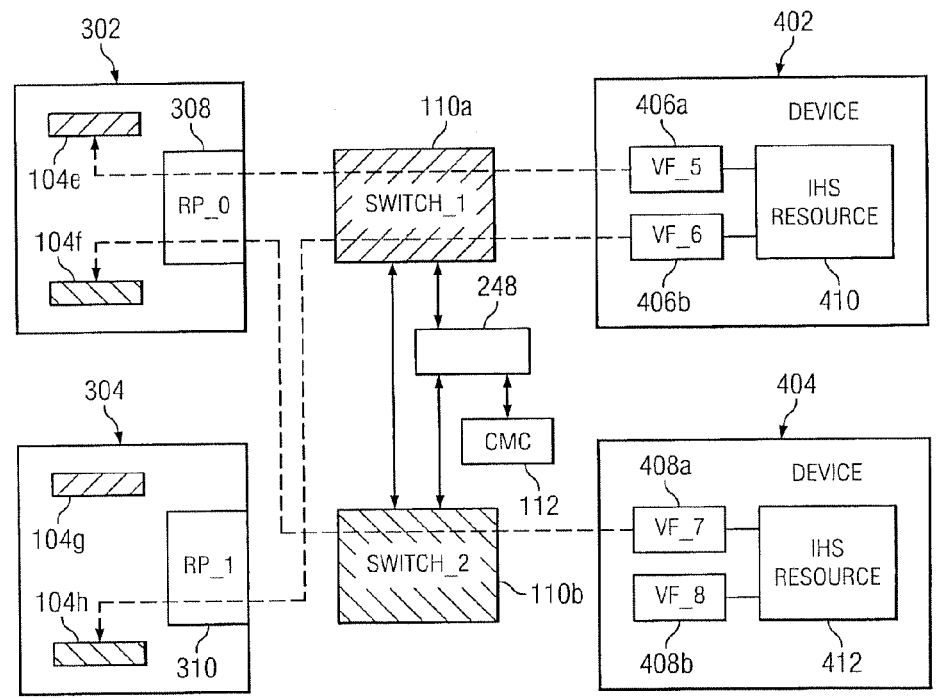

FIGS. 4A and 4B illustrate the operation of an embodiment of system 100 configured to provide mapping of virtual devices to computing nodes in modular chassis 101 wherein mapping of multiple virtual functions from the same device to the same root port of an information handling system is prevented. Device 402 and device 404 may implement, for example, device 236a and device 236b, respectively, from FIG. 2. Blade_1 302 may be accessing device 402 through virtualization provided by virtual function VF_5 406a, wherein communication is routed from device 402 to switch_1 110a to switch interface 104e of blade_1 302 through RP_0 308. Blade_1 302 may attempt to access additional devices. For example, each of device 402 and device 404 may include storage disks and blade_1 302 may include applications attempting to simultaneously write information to redundant disks. In FIG. 4A, chassis management controller 112 may block attempts to map VF_6 406b of device 402, which may have otherwise have been attempted by routing communication from device 402 to switch_1 110a to switch_2 110b to switch interface 104f of blade_1 302 through RP_0 308. Such attempts may have been otherwise made by portions of chassis 101 that are unaware that switch interfaces 104e and 104f are accessed through the same root port, RP_0 308, or that VF_5 406a and VF_6 406b are resident on the same device 402. Thus, such portions of chassis 101 may have attempted to connect switch interface 104f to an available virtual function such as VF_6 406b.

In FIG. 4B, chassis management controller 112 may instead provide an additional virtual function such as VF_7 408a of device 404 to blade_1 302 to service the need for additional resources. In doing so, communication may be routed from device 404 to switch_2 110b to switch interface 104f of blade_1 302. Chassis management controller 112 may thus prevent multiple virtual functions, VF_5 406a and VF_6 406b, on the same device 402 from being mapped to multiple switch interfaces 104e, 104f through the same root port RP_0 308.

Figure 5A:
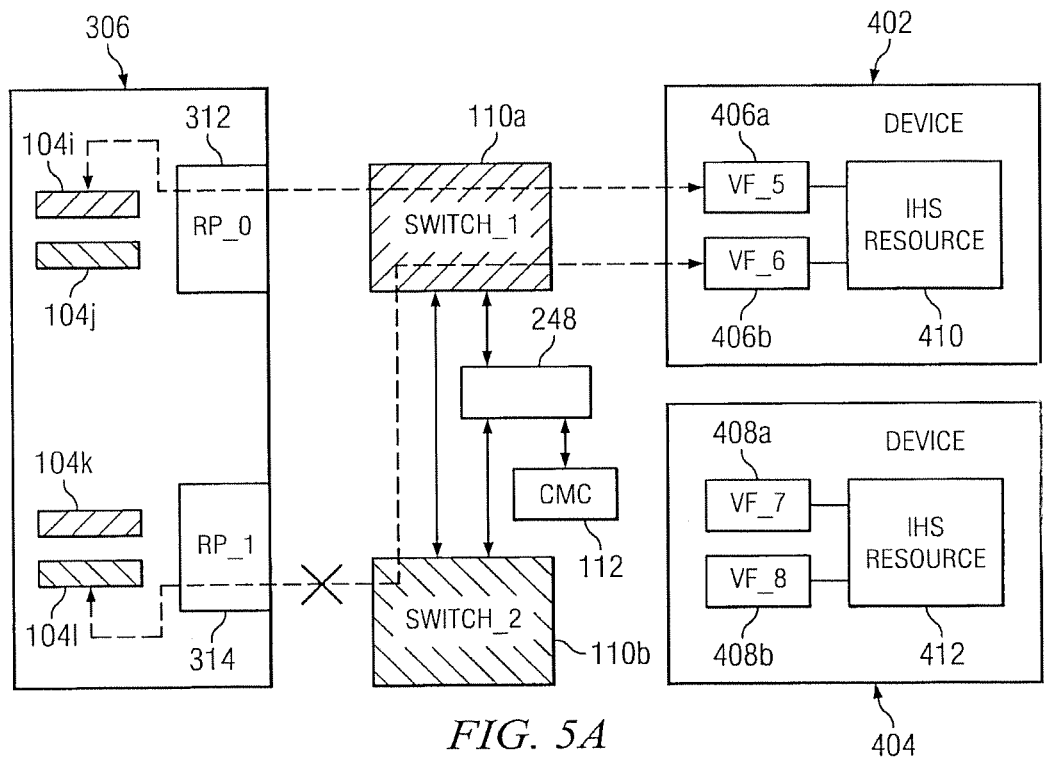
FIGS. 5A and 5B illustrate the operation of another embodiment of a system configured to provide mapping of virtual devices to computing nodes in a modular chassis wherein mapping of multiple virtual functions from the same device to the same information handling system is prevented.
Figure 5B:
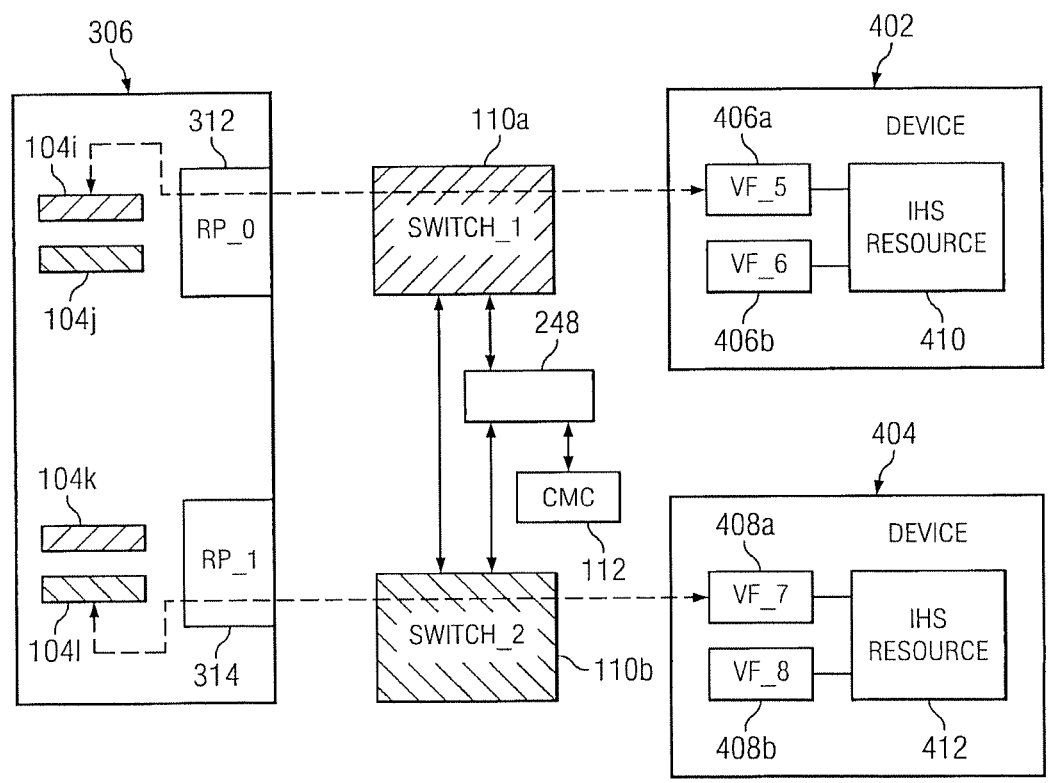

FIGS. 5A and 5B illustrate the operation of another embodiment of system 100 configured to provide mapping of virtual devices to computing nodes in modular chassis 101 wherein mapping of multiple virtual functions from the same device to the same information handling system is prevented. Blade_3 306 may be accessing device 402 through virtualization provided by virtual function VF_5 406a, wherein communication is routed from device 402 to switch_1 110a to switch interface 104i of blade_3 306 through RP_0 312. Blade_3 306 may attempt to access additional devices. For example, each of device 402 and device 404 may include storage disks and blade_3 306 may include applications attempting to simultaneously write information to redundant disks. In FIG. 5A, chassis management controller 112 may block attempts to map VF_6 406b of device 402, which may have otherwise have been attempted by routing communication from device 402 to switch_1 110a to switch_2 110b to switch interface 104l of blade_3 302 through RP_1 314. Such attempts may have been otherwise made by portions of chassis 101 that are unaware that switch interfaces 104i and 104l are resident on the same information handling system, blade_3 306, although through different root ports, or that VF_5 406a and VF_6 406b are resident on the same device 402. Thus, such portions of chassis 101 may have attempted to connect switch interface 104l to an available virtual function such as VF_6 406b.

In FIG. 5B, chassis management controller 112 may instead provide an additional virtual function such as VF_7 408a of device 404 to blade_3 306 to service the need for additional resources. In doing so, communication may be routed from device 404 to switch_2 110b to switch interface 104l of blade_3 306. Chassis management controller 112 may thus prevent multiple virtual functions, VF_5 406a and VF_6 406b, on the same device 402 from being mapped to multiple switch interfaces 104e, 104f of the same device, blade_3 306. Even though mapping of multiple virtual functions VF_5 406a and VF_6 406b may be made through different root ports RP_0 312, RP_1 314 of blade_3 306, chassis management controller 112 may prevent such mapping because the virtual functions VF_5 406a and VF_6 406b from the same device 402 would map to the same information handling system, blade_3 306. If device 402 includes a storage device, chassis management controller 112 may thus prevent disk corruption from attempted simultaneous writes to device 402.

Figure 6:
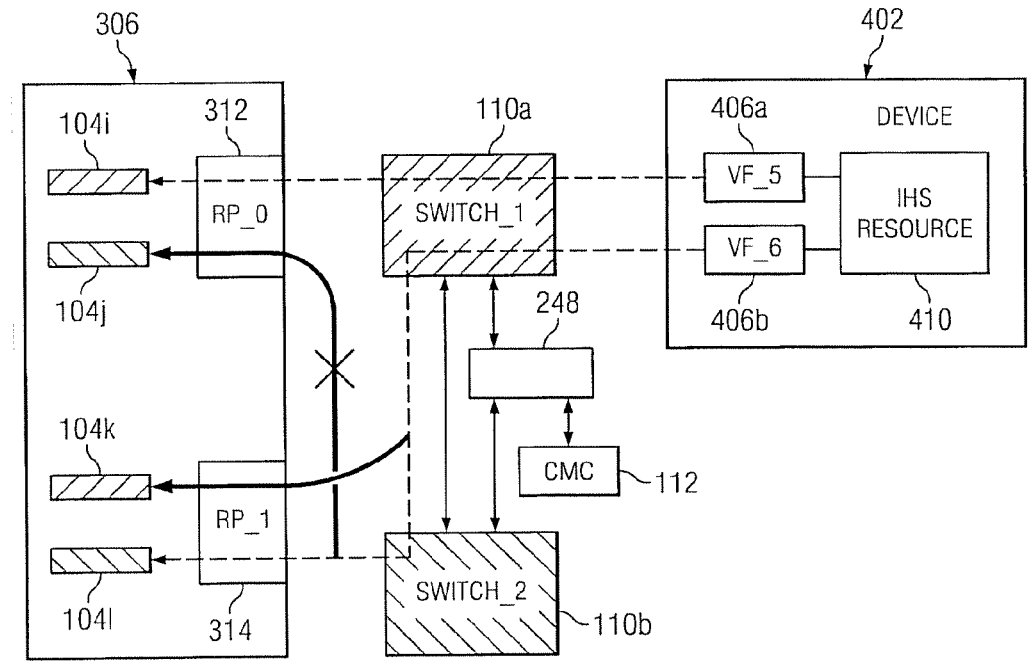
FIG. 6 illustrates the operation of another embodiment of a system configured to provide mapping of virtual devices to computing nodes in a modular chassis wherein prevention of mapping of multiple virtual functions from the same device to the same root port is prevented upon reassignment of a virtual function.

FIG. 6 illustrates the operation of another embodiment of system 100 configured to provide mapping of virtual devices to computing nodes in modular chassis 101 wherein prevention of mapping of multiple virtual functions from the same device to the same root port is prevented upon reassignment of a virtual function. Although FIG. 6 illustrate reassignments of a virtual function between portions of the same information handling system, blade_3 306, such a reassignment may be similarly managed between two information handling systems such as blade_1 302 and blade_2 304. Furthermore, although in various embodiments chassis management controller 112 may be configured to prevent the assignment of any two virtual functions from the same device to the same information handling system, in other embodiments chassis management controller 112 may be configured to allow such an assignment while preventing the assignment of any two virtual functions from the same device to the same root port of an information handling system. For example, in FIG. 6 device 402 may be configured to include or provide access to information handling resources that are not disk storage. In such an example, the risk of information corruption may be less than if device 402 were configured to include or provide access to disk storage.

Blade_3 306 may be accessing device 402 through virtualization provided by virtual function VF_5 406a, wherein communication is routed from device 402 to switch_1 110a to switch interface 104i of blade_3 306 through RP_0 312. Furthermore, blade_3 306 may be accessing device 402 through virtualization provided by virtual function VF_6 406b, wherein communication is routed from device 402 to switch_1 110a to switch_2 110b to switch interface 104l of blade_3 306 through RP_1 314.

Chassis 101 may require reassignment of virtual function VF_6 406b to a different switch interface of chassis 101. Such a reassignment may be made, for example, because the entity, such as an application or virtual machine, on blade_3 306 accessing VF_6 406b has no further need for VF_6 406b, other entities using other switch interfaces have a higher prioritized need for VF_6 406b, or switch interface 104l has been replaced or is experiencing errors.

Chassis management controller 112 may block the reassignment of VF_6 406b from switch interface 104l to switch interface 104j. Chassis management controller 112 may make such a determination not to route VF_6 406b to switch interface 104j because such a reassignment would cause two virtual functions, VF_5 406a and VF_6 406b, from the same device 402 to be assigned to the same root port RP_0 312. Instead, chassis management controller 112 may reassign VF_6 406b to switch interface 104k such that communication would be routed from VF_6 406b through switch_1 110a to switch_2 110b through root port RP_1 314. Such a reassignment may result in two virtual functions, VF_5 406a and VF_6 406b, from the same device to be assigned to different root ports of the same information handling system.

In other embodiments wherein VF_6 406b was assigned to a different information handling system other than blade_3 306, chassis management controller 112 may block the reassignment of VF_6 406b from switch interface 104l to switch interface 104j. Chassis management controller 112 may make such a determination not to route VF_6 406b to switch interface 104j because the reassignment would cause two virtual functions, VF_5 406a and VF_6 406b, from the same device 402 to be assigned to the same information handling system, blade_3 306. In such other embodiments, chassis management controller 112 may reassign VF_6 406b to a switch interface of a device other than blade_3 306 such that communication would be routed from VF_6 406b through switch_1 110a to switch_2 110b through the root port of the other device. Such a reassignment may result in two virtual functions, VF_5 406a and VF_6 406b, from the same device to be assigned to different information handling systems.

Figure 7B:
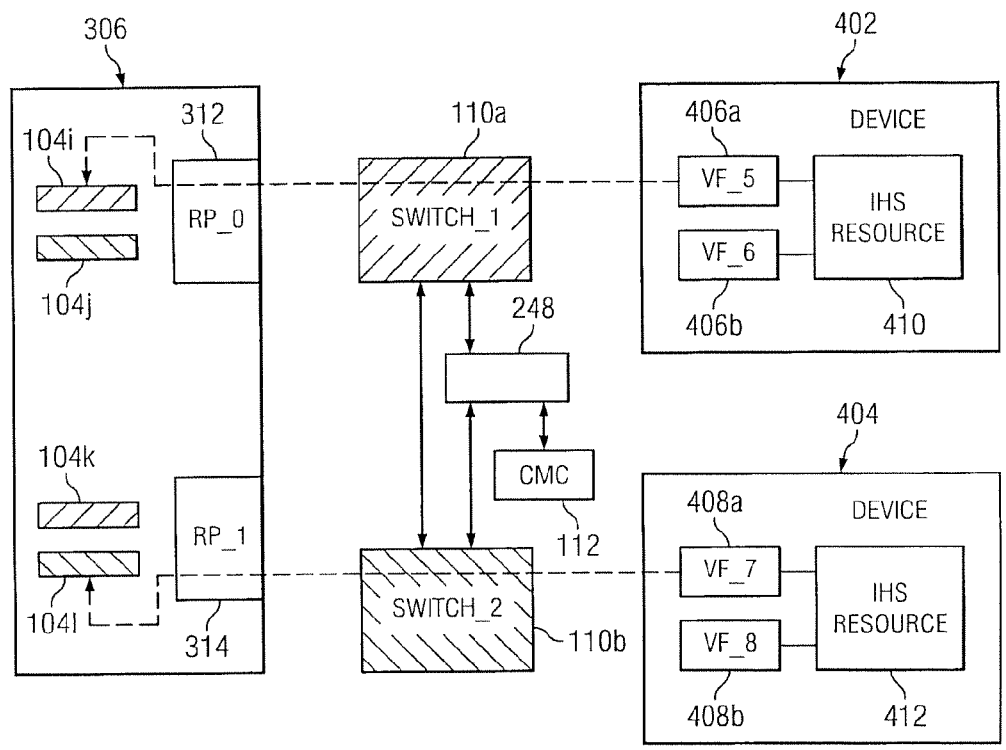
FIGS. 7A and 7B illustrate the operation of another embodiment of a system configured to provide mapping of virtual devices to computing nodes in a modular chassis wherein information handling systems are replaced for information handling systems of different heights.
Figure 7A:
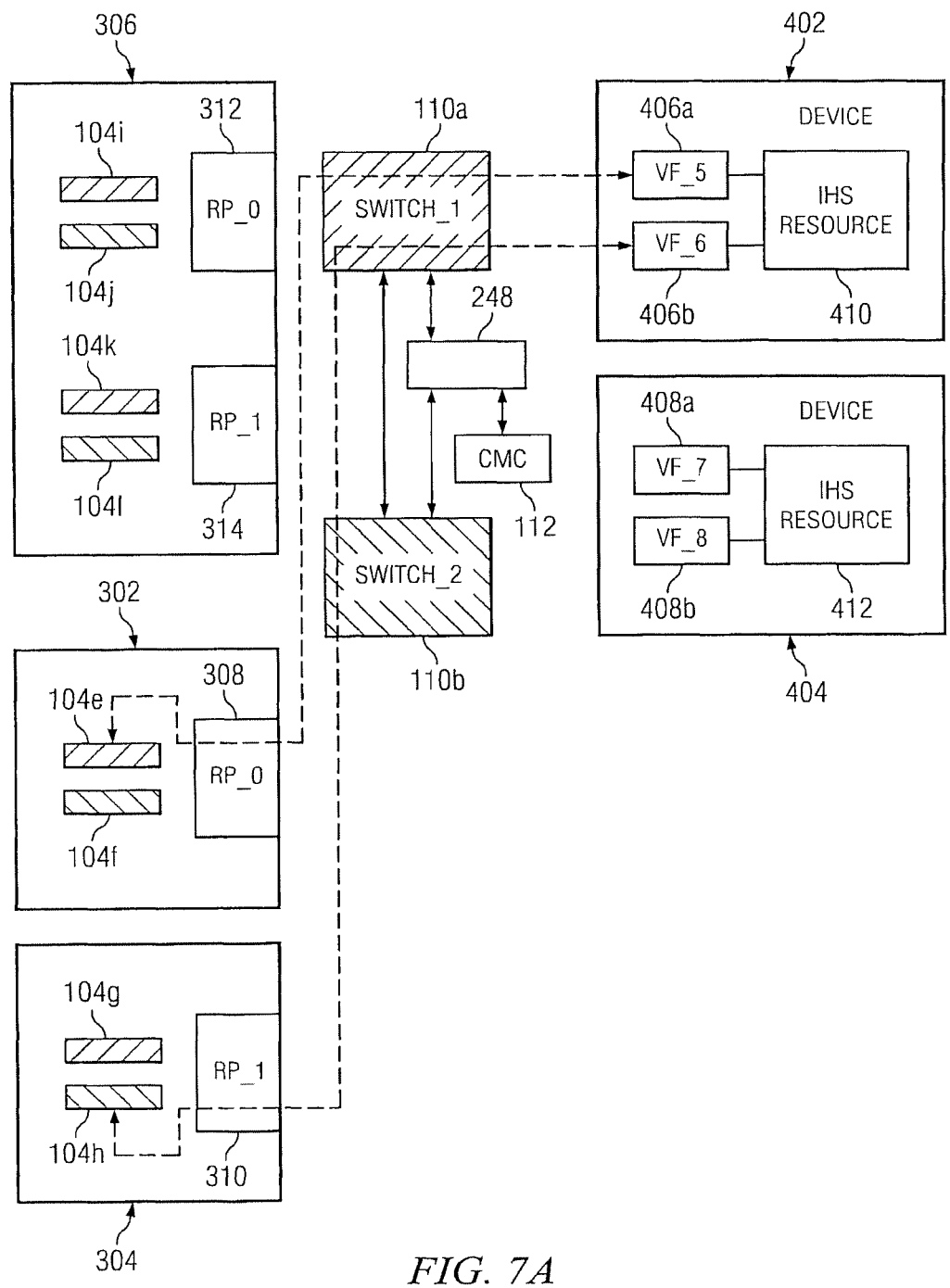

FIGS. 7A and 7B illustrate the operation of another embodiment of system 100 configured to provide mapping of virtual devices to computing nodes in modular chassis 101 wherein information handling systems are replaced for information handling systems of different heights. When information handling systems are replaced in chassis 101, by default chassis 101 and chassis management controller 112 may continue to operate as they operated before the information handling systems are replaced. For example, chassis management controller 112 may preserve virtual function mappings to a slot for an information handling system, even if the actual information handling system in such a slot is replaced, and even if the information handling system is replaced with an information handling system of a different height.

For example, in FIG. 7A, two half-height information handling systems, blade_1 302 and blade_2 304, may be replaced with a single full-height information handling system, blade_3 306. Before blade_1 302 and blade_2 304 are swapped, chassis management controller 112 may have mapped virtual function VF_5 406a to switch interface 104e of blade_1 302 through switch_1 110a and root port RP_0 308, and may have mapped virtual function VF_6 406b to switch interface 104h of blade_2 304 through switch_1 110a to switch_2 110b and through root port RP_0 310. If chassis 101 and chassis management controller 112 maintain the existing mappings, then replacing blade_1 302 and blade_2 304 with blade_3 306 may cause VF_5 406a and VF_6 406b to both be mapped to blade_3 306. In such a case of maintaining existing mappings, blade_3 306 would be mapped to VF_5 406a through switch interface 104i and root port RP_0 312 and to VF_6 406b through switch interface 104l and root port RP_1 314. Such mappings would cause multiple virtual functions, VF_5 406a and VF_6 406b from the same device 402 to both be mapped to same information handling system, blade_3 306.

In FIG. 7B, chassis management controller 112 may deviate from default behavior and change one or more mappings of virtual functions to the information handling system replacing blade_1 302 and blade_2 304. For example, chassis management controller 112 may maintain a mapping of VF_5 406a to switch interface 104i of blade_3 306, which has replaced switch interface 104e of blade_1 302. Furthermore, chassis management controller 112 may change the virtual function assigned to switch interface 104l from VF_6 406b to an equivalent function on another device such as VF_7 408a on device 404. Other suitable changes, such as maintaining the mapping of VF_6 406b and changing the mapping assigned to switch interface 104i may be used. Thus, chassis management controller 112 may prevent the mapping of multiple virtual functions from the same device to the same information handling system when information handling systems are replaced on chassis 101.

Figure 8A:
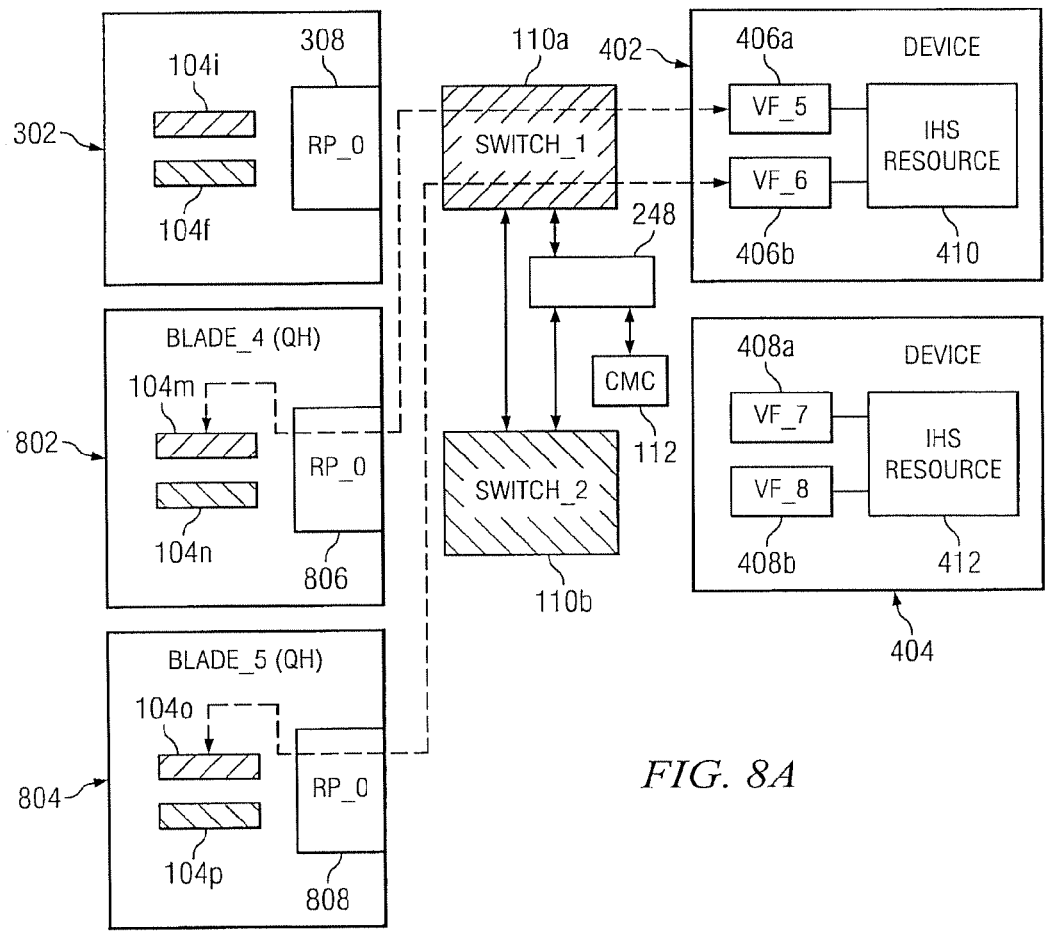
FIGS. 8A and 8B illustrate the operation of yet another embodiment of a system configured to provide mapping of virtual devices to computing nodes in modular chassis 101 wherein information handling systems are replaced for information handling systems of different heights.
Figure 8B:
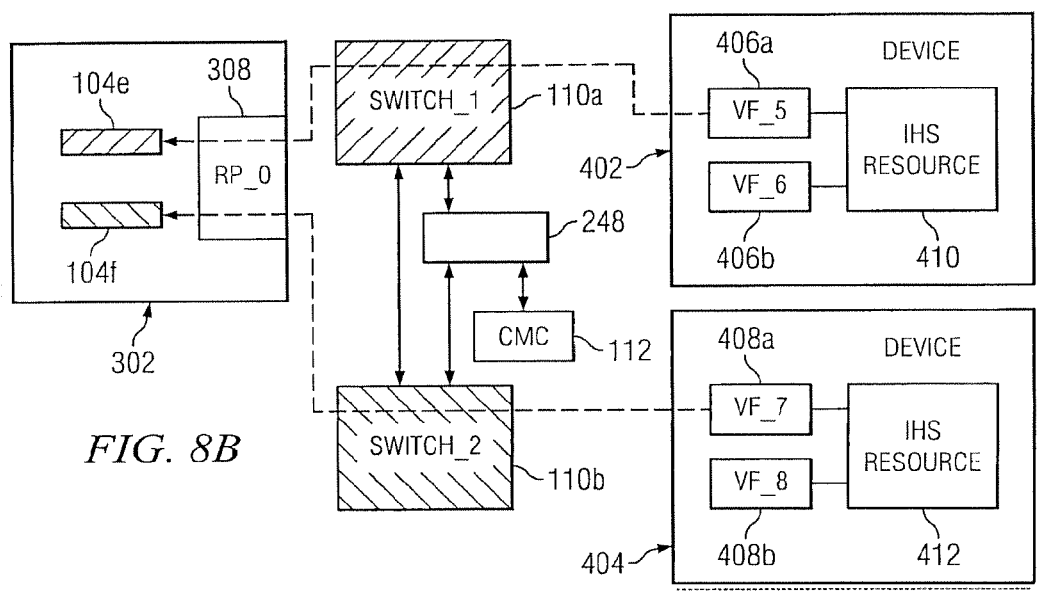

FIGS. 8A and 8B illustrate the operation of yet another embodiment of system 100 configured to provide mapping of virtual devices to computing nodes in modular chassis 101 wherein information handling systems are replaced for information handling systems of different heights.

In FIG. 8A, two quarter-height information handling systems, blade_4 802 and blade_5 804, may be replaced with a single quarter-height information handling system, blade_2 302. Blade_4 802 and blade_5 804 may implement information handling systems 102 of FIGS. 1 and 2. Before blade_4 802 and blade_5 804 are swapped, chassis management controller may have mapped virtual function VF_5 406a to switch interface 104m of blade_4 802 through switch_1 110a and root port RP_0 806, and may have mapped virtual function VF_6 406b to switch interface 104o of blade_5 804 through switch_1 110a through root port RP_0 808. If chassis 101 and chassis management controller 112 maintain the existing mappings, then replacing blade_4 802 and blade_5 804 with blade_1 302 may cause VF_5 406a and VF_6 406b to both be mapped to the same information handling system, blade_1 302. Furthermore, if chassis 101 and chassis management controller 112 maintain the existing mappings, then replacing blade_4 802 and blade_5 804 with blade_1 302 may cause VF_5 406a and VF_6 406b to both be mapped to the same root port, RP_0 308. In such a case of maintaining existing mappings, blade_1 302 would be mapped to VF_5 406a through switch interface 104e and root port RP_0 308 and to VF_6 406b through switch interface 104f and root port RP_0 308. Such mappings would cause multiple virtual functions, VF_5 406a and VF_6 406b from the same device 402 to both be mapped to same information handling system, blade_3 306. Furthermore, such mapping would cause multiple virtual functions, VF_5 406a and VF_6 406b from the same device 402 to both be mapped to same root port, RP_0 308.

In FIG. 8B, chassis management controller 112 may deviate from default behavior and change one or more mappings of virtual functions to the information handling system replacing blade_4 802 and blade_5 804. For example, chassis management controller 112 may maintain a mapping of VF_5 406a to switch interface 104e of blade_1 302, which has replaced switch interface 104m of blade_4 802. Furthermore, chassis management controller 112 may change the virtual function assigned to switch interface 104f from VF_6 406b to an equivalent function on another device such as VF_7 408a on device 404. Other suitable changes, such as maintaining the mapping of VF_6 406b and changing the mapping assigned to switch interface 104e may be used. Thus, chassis management controller 112 may prevent the mapping of multiple virtual functions from the same device to the same information handling system when information handling systems are replaced on chassis 101. Furthermore, chassis management controller 112 may thus prevent the mapping of multiple virtual functions from the same device to the root port when information handling systems are replaced on chassis 101.

Although example replacements of information handling systems in chassis 101 are illustrated in FIGS. 7A, 7B, 8A, and 8B, the techniques illustrated in these figures may be applied to mapping virtual functions when any suitable combination of differently-sized information handling systems are replaced for each other.

Figure 9:
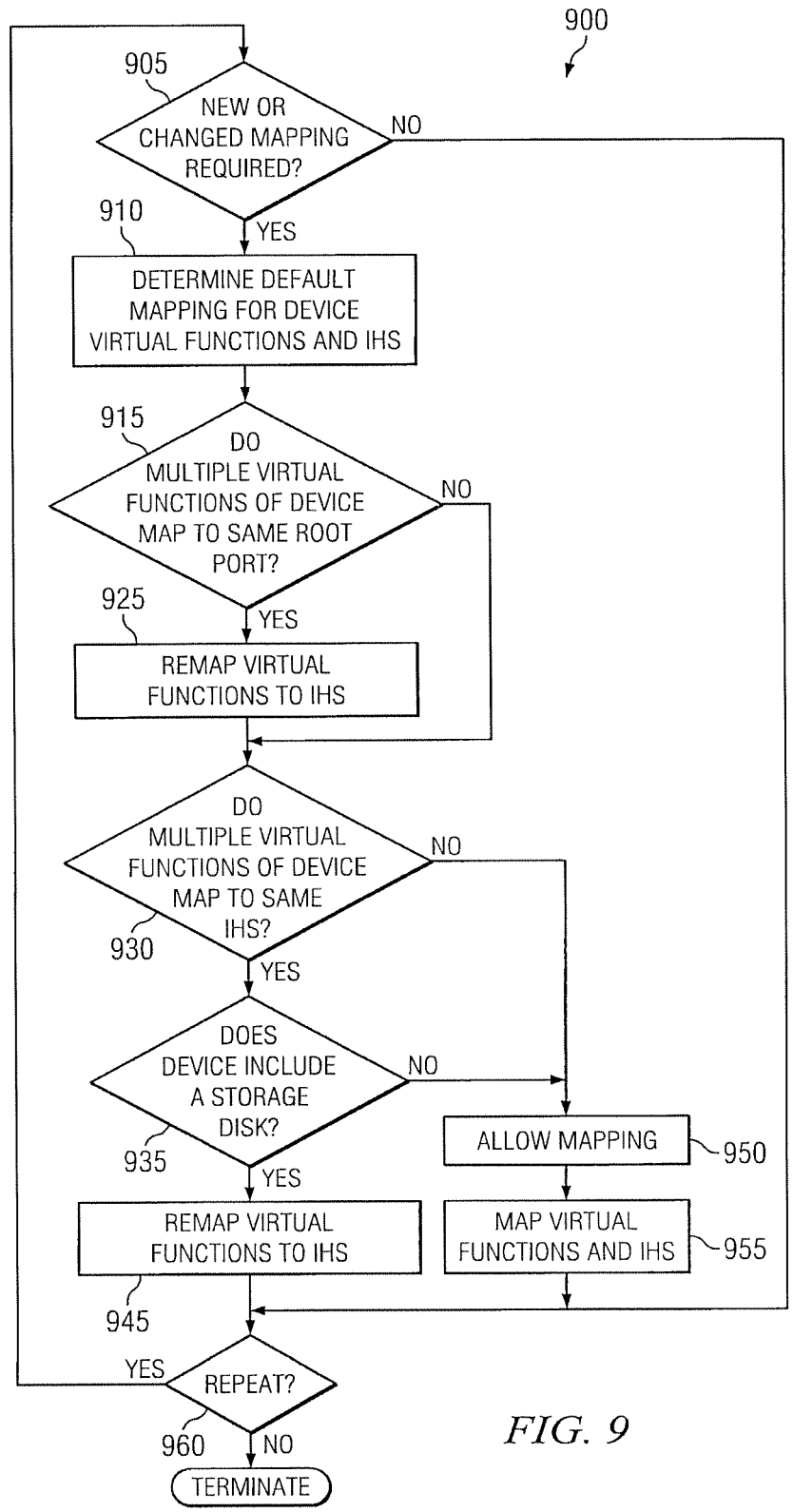
FIG. 9 illustrates a flow chart of an example method for mapping virtual devices to computing nodes in accordance with certain embodiments of the present disclosure.

FIG. 9 illustrates a flow chart of an example method 900 for mapping virtual devices to computing nodes in accordance with certain embodiments of the present disclosure.

Such mapping may be made between information handling systems accessing devices virtualized using SR-IOV or MR-IOV. According to certain embodiments, method 900 may begin at step 905. As noted above, teachings of the present disclosure may be implemented in a variety of configurations of system 100 as shown in FIGS. 1-8. As such, the preferred initialization point for method 900 and the order of the steps comprising method 900 may depend on the implementation chosen.

Method 900 may begin in response to any suitable stimulus or trigger. For example, method 900 may be invoked in response to an asset management decision, command, configuration, or setting. In another example, method 900 may be invoked after a change in utilization, demand, or other criteria regarding information handling resources. In these and other embodiments, method 900 may be implemented as firmware, software, applications, functions, libraries, or other instructions continually monitoring chassis 101. In a further embodiment, method 800 may be implemented fully or partially by such instructions within chassis management controller 112.

In step 905, it may be determined whether new or changed mapping between any device and an information handling system in a system, such as that implemented by chassis 101, is required. Such a new or changed mapping may be the result of, for example: boot-up of the system; boot-up, insertion, or other activation of an information handling system; replacement of information handling systems or devices; loading of a driver or other application in an information handling system; a change in the needs of an application in an information handling system; a prioritization of the available resources of the devices or consumers in the system; or boot-up, insertion, or other activation of a device.

In step 910, default mapping for virtual functions of a device to an information handling system may be determined In one embodiment, such a default mapping may be made be elements of a system such as that implemented by chassis 101 without visibility into the nature and configuration of the relevant information handling systems and devices. The default mapping may be intercepted and reviewed. In another embodiment, default mapping may be made to maintain previous configurations so as not to interrupt operation of applications on the information handling systems. In yet another embodiment, the default mapping may be included as a first iteration of mapping initiated by a controller of the system. Regardless of the manner in which a mapping is created, the mapping may be evaluated according to one or steps 915-935.

In step 915, it may be determined whether multiple virtual functions of a given device map to the same root port of an information handling system. If not, method 900 may proceed to step 930. If so, then in step 925 the virtual functions mapped to the information handling system may be remapped. Any suitable manner of remapping virtual functions to the information handling system may be used. For example, one of the multiple virtual functions from the same device mapped to the same root port may be remapped to a different root port of the same information handling system. However, such a configuration may violate other policies, such as those evaluated in steps 930-935. In another example, one of the multiple virtual functions from the same device mapped to the same root port may be remapped to a different information handling system. Such a remapping may assume that the root port on the different information handling system does not already map to a virtual function of the given device. In yet another example, a virtual function from a different device may be mapped to the root port of the information handling system in place of one of the multiple virtual functions previously mapped from the same device. Such a virtual function from a different device may provide equivalent functionality to the virtual function that has been replaced.

In step 930 it may be determined whether multiple virtual functions of a given device map to the same information handling system. If not, method 900 may proceed to step 950. If so, then in one embodiment in step 935 it may be determined whether the given device includes a storage disk for which the virtual functions provide access. In another embodiment, in step 935 it may determined whether the given device includes any information handling resource that would be corrupted if simultaneously virtualized multiple times to the same information handling system. If not, method 900 may proceed to step 950.

If the given device does include a storage disk for which the virtual functions provide access, then in step 945 the virtual functions mapped to the information handling system may be remapped. Any suitable manner of remapping virtual functions to the information handling system may be used. For example, one of the multiple virtual functions from the same device mapped to the same information handling system may be remapped to a different information handling system. Such a remapping may assume that the different information handling system does not already map to a virtual function of the given device. In another example, a virtual function from a different device may be mapped to the information handling system in place of one of the multiple virtual functions previously mapped from the same device. Such a virtual function from a different device may provide equivalent functionality to the virtual function that has been replaced. Method 900 may proceed to step 960.

In step 950, the mapping may be allowed. In step 955, the virtual functions may be mapped to the corresponding information handling systems through their designated root ports.

In step 960, it may be determined whether method 900 should repeat. If so, method 900 may proceed to step 905. If not, method 900 may terminate.

Although FIG. 9 discloses a particular number of steps to be taken with respect to method 900, it may be executed with greater or lesser steps than those depicted in FIG. 9. In addition, although FIG. 9 discloses a certain order of steps to be taken with respect to method 900, the steps comprising method 900 may be completed in any suitable order.

Method 900 may be implemented using system 100, components thereof or any other system such as those shown in FIGS. 1-8 operable to implement method 900. In certain embodiments, method 900 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
   an interface configured for accessing a first information handling system, a second information handling system, a third information handling system, and a first information handling resource;
   a first virtual function configured to cause virtualized access to the first information handling resource through the interface;

a second virtual function configured to cause virtualized access to the first information handling resource through the interface; and a chassis management controller comprising a processor, the processor configured to selectively map the first virtual function and the second virtual function to information handling systems of the system, the selectively mapping comprising:

determining that the third information handling system has replaced the first information handling system and the second information handling system;

determining a previous mapping of the first virtual function and the second virtual function, wherein the first virtual function was previously mapped to the first information handling system, and the second virtual function was previously mapped to the second information handling system; and based on the previous mapping, changing a mapping of the first virtual function and the second virtual function to prevent the first virtual function and the second virtual function from both being mapped to the third information handling system.

2. The system of claim 1, wherein the first virtual function and the second virtual function are configured to cause virtualization using multiple-root-input-output-virtualization.

3. The system of claim 1, wherein:

the system further comprises a second information handling resource and a third virtual function, the third virtual function configured to cause virtualized access to the second information handling resource through the interface;

the processor is further configured to selectively map the third virtual function to information handling systems of the system; and the selective mapping further includes mapping the first virtual function and the third virtual function to the first information handling system.

4. A method for providing virtualization of information handling resources, comprising:

accessing, through an interface, a first information handling system, a second information handling system, a third information handling system, and a first information handling resource;

accessing a first virtual function configured to cause virtualized access to the first information handling resource through the interface;

accessing a second virtual function configured to cause virtualized access to the first information handling resource through the interface; and selectively mapping the first virtual function and the second virtual function to information handling systems, the selective mapping comprising:

determining that the third information handling system has replaced the first information handling system and the second information handling system;

determining a previous mapping of the first virtual function and the second virtual function, wherein the first virtual function was previously mapped to the first information handling system, and the second virtual function was previously mapped to the second information handling system; and based on the previous mapping, changing a mapping of the first virtual function and the second virtual function to prevent the first virtual function and the second virtual function from both being mapped to the third information handling system.

5. The method of claim 4, wherein the first virtual function and the second virtual function cause virtualization using multiple-root-input-output-virtualization.

6. The method of claim 4, further comprising:

accessing a second information handling resource and a third virtual function, the third virtual function configured to cause virtualized access to the second information handling resource through the interface; and selectively mapping the third virtual function to information handling systems of the system;

wherein selectively mapping the first virtual function, the second virtual function, and the third virtual function further comprises mapping the first virtual function and the third virtual function to the first information handling system.

7. An article of manufacture comprising:

a non-transitory computer readable medium; and computer-executable instructions carried on the computer readable medium, the instructions readable by a processor, the instructions, when read and executed, for causing the processor to:

access a first information handling system, a second information handling system, and a third information handling system, and a first information handling resource;

access a first virtual function configured to cause virtualized access to the first information handling resource through an interface;

access a second virtual function configured to cause virtualized access to the first information handling resource through the interface; and selectively map the first virtual function and the second virtual function to information handling systems, the selective mapping comprising:

determining that the third information handling system has replaced the first information handling system and the second information handling system;

determining a previous mapping of the first virtual function and the second virtual function, wherein the first virtual function was previously mapped to the first information handling system, and the second virtual function was previously mapped to the second information handling system; and based on the previous mapping, changing a mapping of the first virtual function and the second virtual function to prevent the first virtual function and the second virtual function from both being mapped to the third information handling system.

8. The article of claim 7, wherein the first virtual function and the second virtual function cause virtualization using multiple-root-input-output-virtualization.

9. The article of claim 7, wherein the processor is further caused to:

access a second information handling resource and a third virtual function, the third virtual function configured to cause virtualized access to the second information handling resource through the interface; and selectively map the third virtual function to information handling systems of the system;

wherein selectively mapping the first virtual function, the second virtual function, and the third virtual function further comprises mapping the first virtual function and the third virtual function to the first information handling system.

* * * * *